United States Patent [19]

Tanaka

[11] 3,899,154
[45] Aug. 12, 1975

[54] LIGHT REFLECTOR MOLD
[75] Inventor: Morimasa Tanaka, Kanagawa, Japan
[73] Assignee: Ichiko Industries Limited, Tokyo, Japan
[22] Filed: July 19, 1974
[21] Appl. No.: 490,029

Related U.S. Application Data
[62] Division of Ser. No. 404,756, Oct. 9, 1973.

[30] Foreign Application Priority Data
Sept. 5, 1970  Japan.............................. 45-78059

[52] U.S. Cl......................... 249/117; 425/DIG. 808
[51] Int. Cl........................... B29c 1/00; B29d 11/00
[58] Field of Search............. 249/117; 425/DIG. 808

[56] References Cited
UNITED STATES PATENTS
| | | | |
|---|---|---|---|
| 3,277,535 | 10/1966 | Rupert | 425/DIG. 808 |
| 3,417,959 | 12/1968 | Schultz | 425/DIG. 808 |
| 3,443,281 | 5/1969 | Walby | 425/DIG. 808 |
| 3,649,153 | 3/1972 | Brudy | 425/469 |

Primary Examiner—J. Howard Flint, Jr.
Attorney, Agent, or Firm—Wenderoth, Lind & Ponack

[57] ABSTRACT

A mold for making a light reflector having, on a side away from that side facing external light rays, one light-transmitting plane surrounded by three light reflecting units in contiguous relationship. Each reflecting unit has an irregular nonagonal configuration in plan view and has an inner triple reflecting plane structure contiguously surrounded by an outer triple reflecting plane structure. The inner triple reflecting plane structure has a regular hexangle configuration in plan view and the central apex of this hexagon projects toward the outer side of this light reflector. One plane of the inner triple reflecting plane structure and the contiguous two planes of the surrounding outer triple reflecting plane structure constitute one light reflecting element. The apex formed by these three planes is directed toward the inner side of the reflector. The reflecting unit is formed by three of said elements. The light-transmitting plane has a regular triangle shape, the three apexes thereof lying on the lines of conjugation between contiguous adjacent reflecting units. Such a reflector is superior in reflecting efficiency because that very little non-working area and can be made easily at a low cost. Moreover, the mold therefor can be applied to any known reflector shaping machine.

2 Claims, 12 Drawing Figures

LIGHT REFLECTOR MOLD

This is a division of application Ser. No. 404,756 filed 10-9-73

BACKGROUND OF THE INVENTION

1. Field of the Invention

The present invention pertains to a mold for forming a light reflector, and more particularly it relates to the mold for such a reflector which is comprised of a number of adjacently disposed light reflecting units and a light-transmitting plane surrounded by three of such units, and which functions so that the incident light rays coming from an external light source will be reflected at the surfaces of the reflecting units in a direction opposite to that of the incident light rays and light rays coming from a source located on the inner side of the reflector are permitted to pass effectively through the transmitting plane.

2. Description of the Prior Art

Known light reflectors are each comprised of a number of light reflecting elements each having triple reflecting planes connected together at right angles. Such reflecting elements are provided and connected together on one side of the reflector. In these known reflectors, some of the reflecting elements or parts of these elements are shaped to have a horizontal plane face or a semi-spherical face to provide light-transmitting planes or surfaces. In such a reflector, the incident light rays coming from the direction of the optical axis are reflected back in the opposite direction by the triple reflecting planes. However, those incident light rays coming from directions other than the direction of the optical axis are reflected in directions different from the direction of incidence. Therefore, this reflector has a low efficiency of reflection. Moreover, no reflection is effected at the light-transmitting planes. Accordingly, the effective reflecting area is reduced by the amount of light-transmitting area.

The inventor previously developed a reflector having a superior light reflecting ability and put it into practice. In this prior reflector, each light reflecting element is comprised of three reflecting planes connected together at right angles. A regular triangle light-transmitting horizontal plane is formed between the surrounding four reflecting elements. More specifically, among the four reflecting elements, one plane of each of three reflecting elements which are adjacent to each other is cut out, and a regular triangle light-transmitting horizontal plane is formed at the location of these cut-out elements. However, a reflector made in this manner gives rise to the drawbacks and inconveniences that when light rays impinge on the reflector in the direction of the optical axis, there develop in each of the three reflecting elements non-working portions each having an area the same as that of the light-transmitting plane. Therefore, this improved prior reflector theoretically has a loss of reflection of as much as about 25% and has an effective ratio of reflection of about 75%.

SUMMARY OF THE INVENTION

It is, therefore, a primary object of the present invention to provide a mold for a light reflector having a loss of reflection lower than that described above and an effective ratio of reflection higher than that described.

Another object of the present invention is to provide a mold for a light reflector of the type described, which performs reflection in such a way that for an incident light coming in the direction of 0°, the respective reflecting elements effect reflection independently of each other, and which performs transmission of light in such a way that it does not make the reflecting planes excessively non-reflective and that it allows the light rays from an inner light source to pass efficiently at appropriately arranged sites and further that the reduction of efficiency of reflection caused by the provision of the light-transmitting planes is minimized.

Still another object of the present invention is to provide a mold which is capable of molding the reflector of the type described and which can accomplish this molding by utilizing a known molding apparatus at a low cost and with ease.

Other objects as well as the attendant advantages of the present invention will become apparent from the following detailed description of the preferred embodiment of the present invention when taken in conjunction with the accompanying drawings.

BRIEF DESCRIPTION OF THE DRAWINGS

The accompanying drawings illustrate an embodiment of the present invention wherein.

DETAILED DESCRIPTION OF THE PREFERRED EMBODIMENT

Figure 1:
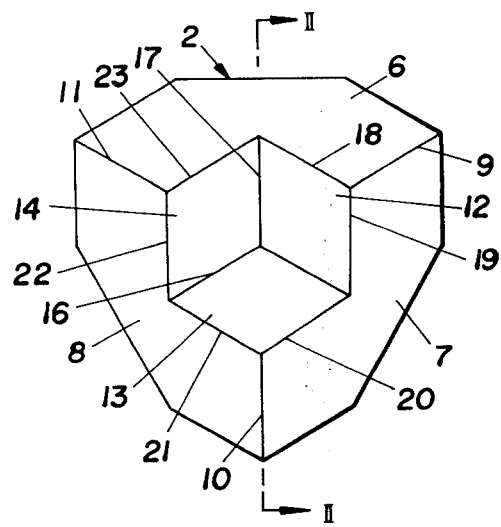
FIG. 1 is a rear view of a single reflecting unit.
Figure 2:
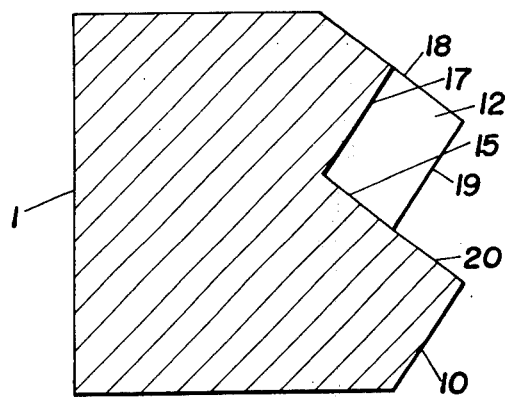
FIG. 2 is a sectional view taken along the line II—II in FIG. 1.

The reflector made in the mold of the present invention is a molded plastic article. It has one flat external side 1. On the surface of the opposite internal side, it has a number of light reflecting units 2a, 2b, 2c, .... As shown in FIGS. 1 and 2, each of these light reflecting units is nonagonal when viewed looking toward said internal side. The internal side surface of said reflecting unit has an inner triple reflecting plane structure having three planes 12, 13 and 14 connected together at right angles at edges 15, 16 and 17 which is positioned within an outer triple reflecting plane structure having three planes 6, 7 and 8 connected together at right angles at edges 9, 10 and 11. The corner which is formed by the three planes in said inner triple reflecting plane structure projects toward said one external side 1, whereas the corner at which the three planes in said outer triple reflecting plane structure meet would, in the absence of said inner reflecting plane structure, project in a direction opposite to the first-occuring corner, i.e. in the direction away from the flat side 1 of the reflector. The surfaces of these inner and outer triple reflecting plane structures are disposed at a angle of 60° relative to each other. More precisely speaking, the edges 9–11 at the junctions of the three planes of the outer triple reflecting plane structure are disposed at a relative angle of 60° with respect to the similar edges 15–17 at the junctions of the three planes of the inner triple reflecting plane, when the reflector is viewed from directly above. A line passing through the corners of these two triple reflecting plane structure, in other words, the line passing through the points of intersection of the two groups of three planes (in the case of the outer structure, the point of intersection of the extensions of the edges formed by the three junctions of planes) is perpendicular to said flat side 1. The edges 18–23 is formed by the junctions between the respective planes 6, 7 and 8 of the outer triple reflecting plane structure and the respective planes 12, 13 and 14 of the inner triple reflecting plane structure have a regular hexagonal configuration when viewed from directly thereabove. Thses planes are joined together at right angles at the junction edges 18–23.

Figure 5:
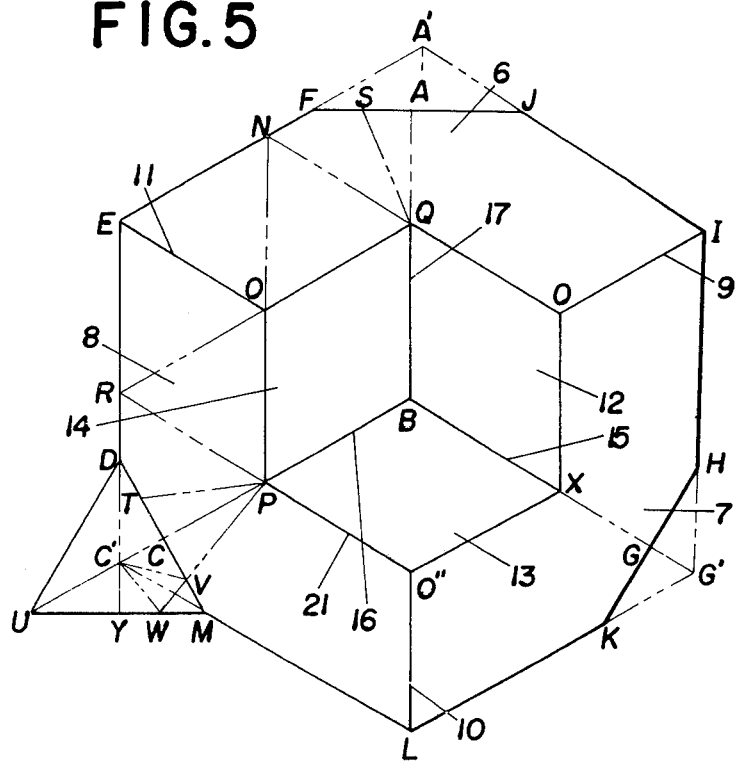
FIG. 5 is an explanatory illustration, on an enlarged scale, showing the relationship between the individual reflecting planes in the reflecting unit and the relationship between these reflecting planes and their mating light-transmitting planes.

As shown in FIG. 5, this light reflecting unit provides three adjacently disposed ligh reflecting elements, one of which is represented by a hexangle ABCDEF, as seen in plan view, about the intersection-point O of the two planes 6 and 8 of the outer triple reflecting plane structure and by the single plane 14 of the inner triple reflecting plane structure. In a similar way, another light reflecting element which is a hexangle CBGKLM is formed by the two planes 7 and 8 of the outer structure and by the single plane 13 of the inner structure. Still another reflecting element which is a hexangle ABGHIJ is formed by the two planes 6 and 7 of the outer structure and by the single plane 12 of the inner structure. In this way, the light reflecting unit 2 is comprised of three light reflecting elements. It should be noted that each of the adjacent planes 6, 7 and 8 of the outer triple reflecting plane structure forms a part of two adjacent reflecting elements. In the light reflecting element ABCDEF which is hexagonal in plan view configuration, let us suppose that the intersection point of the extension of side edge EF and a line extending at a right angle from point A of a side edge FA is indicated by A′ and that similarly the intersection point between the extension of side edge ED and the line extending at a right angle from point C of a side edge DC is indicated by C′. The plan view configuration formed by connecting A′, B, C′ and E will be a rhombic figure formed about the center which is point O. More specifically, line A′E is parallel with line BC′, and line A′B is parallel with line EC′. Also, <A′BC′ is equal to <A′EC′, both being 120°, whereas, <EA′B is equal to <BC′E, both being 60°. Thus, the two diagonal lines A′C′ and BE cross each other at right angles. As a result, the light reflecting element which is a hexangle ABCDEF will have a configuration that lacks ΔA′AF and ΔC′CD — which constitute the light-transmitting regions — from the rhombic shape A′BC′E. The edge AF by which ΔA′AF is separated from the rhombic shape lies along a line which connects point A to point F located on line A′E at a distance within one half of the length of line A′E from point A′ and which is perpendicular to line A′B of the rhombic shape A′BC′E. Also, the line CD by which ΔCC′D is separated from the rhombic shape lies along a line which connects point C to point D located on line EC′ at a distance within one half of the length of line EC′ from point C′ and which is perpendicular to line C′B of the rhombic shape A′BC′E. It should be noted that A′F=DC′, <FA′A=<DC′C, and <A′AF=<DCC′. Accordingly, ΔA′AF=ΔDC′C. In a similar way, ΔC′CD, ΔA′AJ, ΔHGG′, ΔGKG′, and ΔC′CM can be formed. These six right-angled triangles which constitute the light-transmitting regions are congruent with each other because their hypotenuses and their three angles are identical with each other. Accordingly they have identical areas.

Figure 4:
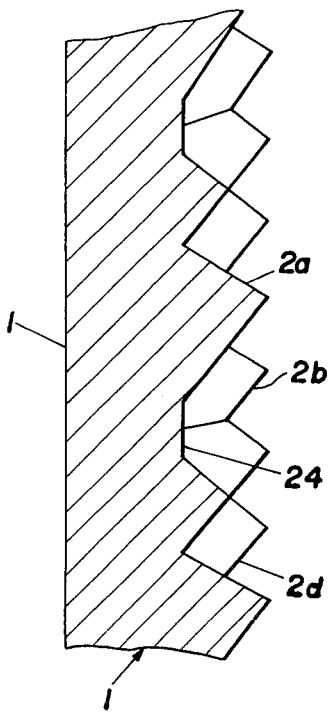
FIG. 4 is a sectional view taken along the line IV—IV in FIG. 3.
Figure 3:
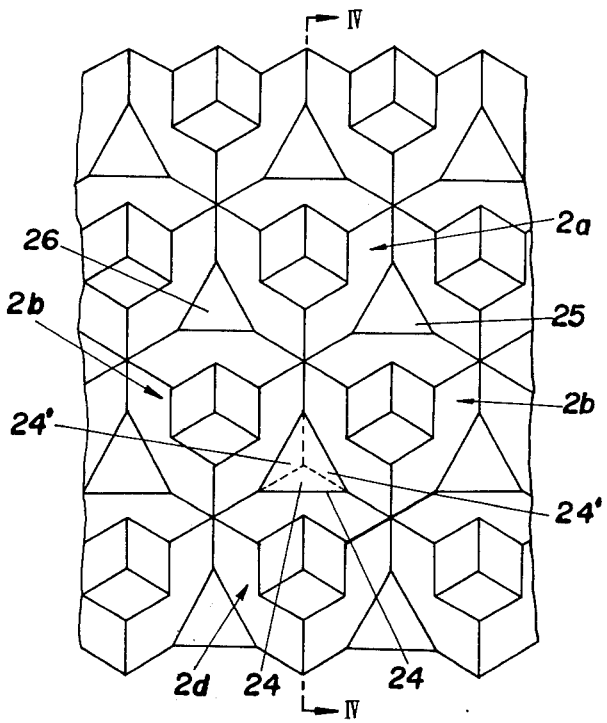
FIG. 3 is a rear view of the light reflector of the present invention, showing a number of the reflecting units conjugated together.

The reflecting units each having the foregoing arrangement are disposed in adjacent relationship relative to each other as shown in FIGS. 3 and 4. A description will be given of the positional relationship between the respective reflecting units. The reflecting units are arranged so that there is defined among each set of three reflecting units by the side edge DM of the reflecting unit 2b, the side edge HK of the reflecting unit 2c and the side edge FJ of the reflecting unit 2a, a complete triangular light-transmitting plane, such as triangular plane 24 made up of the light-transmitting sections 24′, 24″, 24‴ and located adjacent to the respective light reflecting elements. It should be understood that in the embodiment shown the exposed surfaces of the light-transmitting planes 24, 25, 26 which are thus formed are flat and parallel to external side 1. However, it should be understood that these light-transmitting regions can have an optical curved face or be in combination with some other optical systems as required.

When external light rays impinge on the reflector through the side 1 of the reflector onto the reflecting units 2, 2a, 2b, ... in a direction perpendicular to the planes of each triple reflecting plane structure, i.e. in the direction of 0° relative to the optical axis of each reflecting unit, the respective reflecting elements O-ABCDEF, O′-ABGHIF, and O″-BGKLMC will exert a reflecting action independently of each other. This reflecting action will hereinafter be described in further detail with respect to, for example, the reflecting element O-ABCDEF. The light rays incident to the plane OEN are reflected at this plane, and therefrom these reflected light rays impinge onto the plane OER and are reflected thereat. Then, the reflected light rays impinge further onto the plane OBP and are reflected thereat. From there, the light rays are emitted from the reflector in a direction opposite to that of the initial incident light rays. On the other hand, those light rays which impinge on the plane ONFSQ reflect out of the reflector from the plante ORDTP. Also, the light rays impinging on the plane ORDTP are reflected out of the reflector from the plane ONFSQ. Those light rays incident on the plane OER are reflected out of the reflector from the plane OBQ, and those light rays impinging on the plane OBP are reflected out of the reflector from the plane OEN, and those light rays incident on the plane OBQ are reflected out of the reflector from the plane OER. It should be understood that points N and R serve as the mid-points of the lines A′E and EC′ respectively of the rhombic shape A′BC′E, and that point S represents the intersection of the side edge FA and the line SQ, which crosses the line connecting O and Q, i.e. the edge 23 shown in FIG. 1, at right angles at point Q. On the other hand, point T represents the intersection of the side edge DC and the line crossing the line connecting P and O, i.e. the edge 22 shown in FIG. 1 at right angles at point P. As stated above, despite the provision of the light-transmitting regions $\Delta A'AF$ and $\Delta C'CD$ for obtaining light-transmitting action, the light reflecting efficiency of the reflecting element O-ABCDEF is such that loss of reflection occurs only in the very limited areas of both $\Delta AQS$ and $\Delta PCT$. Thus, this reflecting element achieves extremely effective reflection. The same thing is true for the reflecting efficiencies of the two reflecting elements O'-ABGHIJ and O''-BGKLMC.

Light rays from a light source are transmitted through the aforesaid light-transmitting planes, so that there occurs no excessive drop in the reflecting efficiency of the reflector, and moreover, an undesirably large loss of reflection at the reflecting members is prevented.

More specifically, in FIG. 5, the sum of the areas of the light reflecting elements O-ABCDEF, O'-ABGHIJ, and O''-BGKLMC, and the area of the light-transmitting plane MUD is equal to the area of the hexangle A'IG'LC'E, and this area is four times the area of the inner triple reflecting plane structure QO'X-O''PO. In addition, the area of the light-transmitting plane MUD is one half that of the inner triple reflecting plane structure. Furthermore, the non-working region PVT is equal to $\Delta MWV$, and to $\Delta WC'V$, and also to the sum of $\Delta VCC'$ and $\Delta WC'Y$, in the complete light-transmitting plane, respectively. Accordingly, the sum of the areas of the three non-working regions of reflection in the reflecting unit is equal to the area of the quadrangel MWC'C in the complete light-transmitting plane and is equal one third (1/3) of the entire area of the complete light-transmitting plane. As such, when the area of the hexangle A'IG'LC'E is 1, the ineffectiveness ratio can be expressed by the follwing equation:

$$\text{Ineffectiveness ratio (\%)} = \frac{(\text{area of complete light-transmitting planes} + \text{area of non-working portions})}{(\text{area of reflecting elements} + \text{area of complete light-transmitting planes})} \times 100$$

Therefore, $$\text{Ineffectiveness ratio} = \frac{1/2 + (1/2 \times 1/3)}{4} \times 100 = 1/6 \times 100$$

also, the reflecting efficiency will be:

Reflecting efficiency (%) = (1 - 1/6) X 100 Thus, theoretically, the ineffectiveness ratio will become approximately 16.65% and the reflecting efficiency will become approximately 83.33%.

Figure 6:
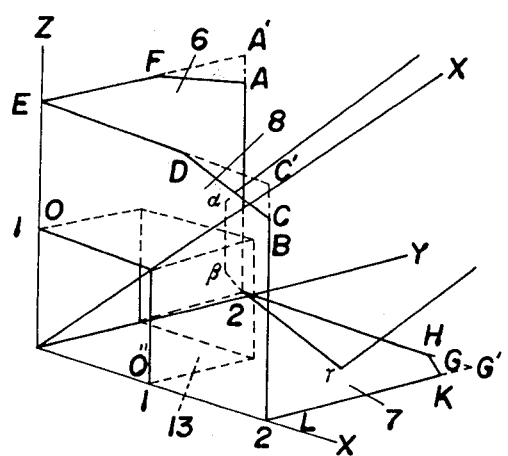
FIGS. 6 and 7 are diagrammatic illustrations for explaining the reflecting actions of the reflecting unit.
Figure 7:
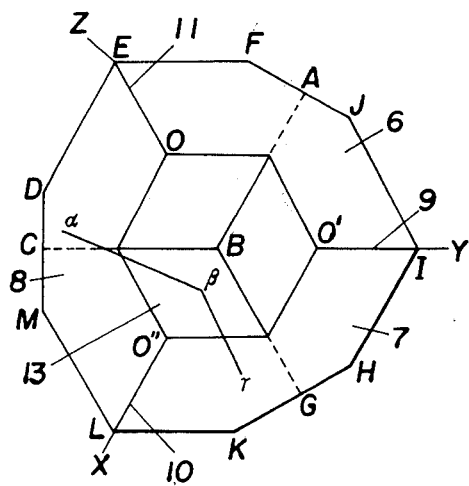

On the other hand, if the light rays incident on the reflecting units 2, 3, 4, 5 are at an angle relative to the line passing through the common corners of the triple reflecting plane structures constituting these reflecting units, each two of the reflecting elements will cooperate in performing reflecting action. This operation will be explained as follows by referring to FIGS. 6 and 7. It should be understood that in the following explanation there are employed those reference numerals which have been used in the description of the reflecting unit shown in FIG. 5.

Let us now assume that the edges 9, 10 and 11 formed between the respective planes 6, 7 and 8 of the outer reflecting plane structure are represented by the axes of co-ordinates X, Y, Z, respectively, and that light rays impinge on the reflecting element O-ABCDEF in a direction inclined 10° toward the axis Z. The directional cosine in such an instance will be (0.4977, 0.4977, 0.7103). Let us assume also that these light rays impinge on point $\alpha$ (1.7, 0, 1.8) on the co-ordinate system, X-Y-Z and are reflected thereat. The directional cosine of these reflected light rays will be (0.4977, −0.4977, 0.7103). The path of the incident light ray (rectlinear) will accordingly be expressed by the following equation:

$$\frac{X-1.7}{0.4977} = \frac{Y}{-0.4977} = \frac{Z-1.8}{0.7103} \quad (1)$$

This beam of light rays impinges on the plane of X = 1, i.e. onto the reflecting plane 13 of the reflecting element O''-BGKLMC. The co-ordinate of the point $\beta$ of incidence of this beam will have the following value which is obtained by substituting X = 1 in the equation (1).

X = 1
Y = 0.7
Z = 0.8

The beam of light rays incident at point $\beta$ is reflected at the reflecting plane 13 of X = 1 and the directional cosine of the reflected beam of light will be (−0.4977, −0.4977, 0.7103). Accordingly, the path of this reflected beam of light will be expressed by the following equation:

$$\frac{X-1}{0.4977} = \frac{Y-0.7}{-0.4977} = \frac{Z-0.8}{0.7105} \quad (2)$$

This beam of light impinges on the plane of Z - O, i.e. onto the reflecting plane 7 of O-BGKLMC. Therefore, the co-ordinates of the point $\delta$ of incidence is found by substituting Z = 0 in the equation (2), and the following value is obtained.

X = 1.56
Y = 1.26
Z = 0

The directional cosine of this beam of light reflected at point $\delta$ will be (−0.4977, −0.4977, −0.7103). Thus, the direction of this beam will be different from the incident beam of light only in that it is opposite in direction.

As stated above, when the incident beam of light rays impinges at an angle relative to the axis passing through the corner B, this beam of light is reflected out of the reflector by being subjected to the cooperative reflecting actions of the two reflecting elements O-ABCDEF and O'''-BGKLMC. Accordingly, it is possible also to effectively reflect a beam of light in the direction opposite to that of incidence, which in the prior art could not be effected since the respective reflecting elements always exert their reflecting actions independently of each other. In the present invention even where the light is incident on the reflector at an angle, there is very little loss of reflection at the light-transmitting regions as stated above previously.

The reflector described hereinabove is molded with either glass or a plastic material by the use of a mold described below.

Figure 8:
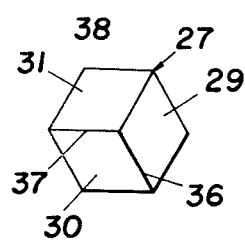
FIG. 8 is a plan veiw of a type of pin constituting a mold.
Figure 9:
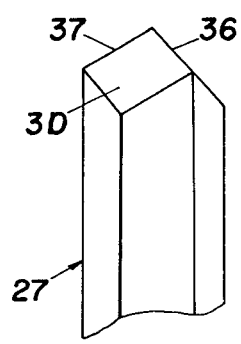
FIG. 9 is a side elevation of the same.
Figure 10:
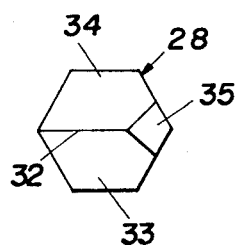
FIG. 10 is a plan view of another type of pin.
Figure 11:
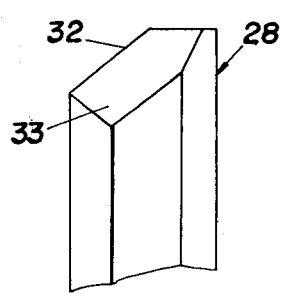
FIG. 11 is a side elevation of the same.

This mold is comprised of a combination of central pins shown in FIGS. 8 and 9 and adjacent pins shown in FIGS. 10 and 11. The central pin 27 has a regular hexagonal cross-section. One end of this central pin has an apex formed on the central longitudinal axis. At this one end, three square planes 29, 30 and 31 are meet at right angles at said apex. The adjacent pin 28 also has a regular hexagonal cross-section. The end face of the adjacent pin 28 has two planes 33 and 34, one of which crosses the other at right angle at the common side edge 32 which is inclined with respect to the central logitudinal axis of this pin. The common apex of these two planes 33 and 34 is cut in a plane which crosses at right angles the central logitudinal axis of this pin to provide a flat plane 35. Thus, this end of the pin 28 has an end portion which has an angled truncated pyramid configuration. More specifically, this truncated pyramid configuration which is formed by a plane 35 and planes 33 and 34 is such that the end face of a column of a regular hexagonal cross-section is cut by two planes 33 and 34 which cross each other at right angles at the common edge 32 corresponding to the diagonal line passing through the central longitudinal axis of this hexagonal column, and is such that the apex located at one end of the edge 32 is at a level different from that of the apex at the other end, and is such that the two tetrahedrons formed by the two planes 33 and 34 are cut by said plane intersecting the central logitudinal axis at right angles to provide the plane 35. Accordingly, one end of the adjacent pin 28 constitutes an enneahedron including the lateral faces of this pin. Furthermore, the edges 36, 37 and 38 formed at one end of the central pin 27 and the edge 32 formed at one end of said adjacent pin 28 are both inclined at the same angle relative to said plane intersecting at right angles the central logitudinal axis of the hexagonal column.

Figure 12:
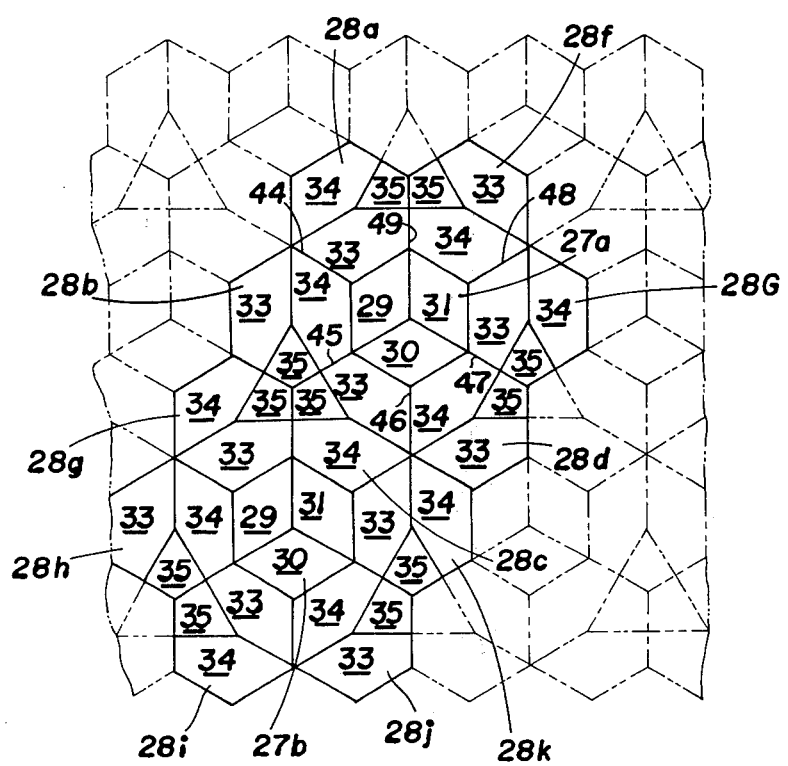
FIG. 12 is a plan view of the mold, showing the disposition of the pins.

The mold for use in the shaping of the reflector is constructed by arranging six adjacent pins 28 around a central pin 27. In this arrangement, the adjacent pins 28 are disposed in such a way that their respective faces 35 are positioned adjacent to each other. This arrangement will be explained hereinafter by referring to FIG. 12. Adjacent pins 28a – 28f are disposed around the central pin 27a. Adjacent pins 28a and 28b are in a positional relationship such that their planes 35 are positioned symmetrically relative to the junction line 44 of these two pins. Adjacent pins 28b and 28c are arranged adjacent to each other and are symetrical relative to the junction line 45. Similarly, adjacent pins 28c and 28d are in a positional relationship such that their planes 35 are positioned symmetrically relative to the junction lines 47, 28 and 49, respectively. In this way, there are six adjacent pins 28a – 28f abutted together surrounding the central pin 27a. Similarly, adjacent pins 28c, 28g – 28k are abutted together around another central pin 27b in such a way that their upper faces 35 are positioned adjacent to each other. In this arrangement, adjacent pin 28c is positioned adjacent to the central pins 27a and 27b and is sandwiched therebetween. Accordingly, the plane 29 of the central pin 27a, the plane 33 of the adjacent pin 28a, and the plane 34 of the adjacent pin 28b cooperate in forming a reflecting element of the reflector. In the same way, another reflecting element is formed by the plane 30 of the central pin 27a, and by the planes 33 and 34 of the adjacent pins 28c and 28d, respectively, and the remaining reflecting element is formed by the plane 31 of the central pin 27a, and by the planes 33 and 34 of the adjacent pins 28e and 28f, respectively. These reflecting elements together constitute a reflecting unit. Likewise, the plane 31 of the central pin 27b and the planes 34 and 33 of the adjacent pins 28c and 28k; the plane 29 of the central pin 27b and the planes 33 and 34 of the adjacent pins 28g and 28h; and the plane 30 of the central pin 27b and the planes 33 and 34 of the adjacent pins 28i and 28j form reflecting elements, respectively. These three reflecting elements constitute another reflecting unit. At the same time, a light-transmitting region is formed by the respective planes 35 of the adjacent pins 28b, 28g and 28c. It will be clearly understood from the foregoing explanation that the required number of reflecting units and light-transmitting planes can be formed in the same manner.

It will be understood also that the number of central pins and the number of the adjacent pins which are required for constituting a mold are determined by the numerical relationship in which, when the number of the central pins is designated as $n$, the number of the adjacent pins will be $4n + 3$, provided that $n$ is 2 at the least. It should thus be understood that this mold is constructed by a small number of central pins 27 and a large number of adjacent pins 28 and that these respective pins are of regular hexagonal cross-section. Therefore, it is possible to use this mold in any known reflector shaping machine. It will be apparent without further discussion that such a mold is able to make the novel reflectors, requiring no alteration of known reflector forming machines.

In the aforesaid embodiment, the planes 35 of the adjacent pins each have a flat surface. It should be understood, however, that if it is desired to prepare a light-transmitting region having a semi-spherical surface, it is only necessary to form the respective planes 35 of the adjacent pins constituting the light-transmitting plane so as to have a complementary concave surface.

The foregoing description has been directed to the preferred embodiment of the present invention. However, it should be possible to make various modifications without departing from the spirit and scope of the present invention. It should be understood, therefore, tht such modifications are included within the scope of the appended claims.

I claim:
1. A mold for shaping a light reflector, comprising:
   a. a plurality of central pins each having a regular hexagonal cross-section and having on one end three square flat planes joined with each other at right angles to form an apex projecting toward the outside of the mold, and,
   b. a further plurality of adjacent pins each having a regular hexagonal cross-section and having, on one end, two planes at right angles to each other on the opposite sides of a common edge, said common edge being inclined with one end of said common edge projecting toward the outer side of the mold relative to the longitudinal axis of said adjacent pin at an angle the same as that of any two of the three square flat planes on said one end of the central pin relative to the longitudinal axis of the central pin, and also having, at said one end of the adjacent pin, a plane crossing said common edge line, . each of said central pins being surrounded by six of said adjacent pins with each of the three flat planes of the central pin meeting at its two outer edge lines two flat planes of two of the surrounding adjacent pins at right angles.

2. A mold for shaping a light reflector according to claim 1, in which said central pins and said adjacent pins have therebetween a numerical relationship such that, when the number of said central pins is designated as $n$, the number of said adjacent pins is $4n + 3$, provided that $n$ is 2 at the least.

* * * * *